US011444712B2

(12) United States Patent
Obiya et al.

(10) Patent No.: US 11,444,712 B2
(45) Date of Patent: Sep. 13, 2022

(54) MULTIPLEXER AND COMMUNICATION DEVICE

(71) Applicant: Murata Manufacturing Co., Ltd., Kyoto (JP)

(72) Inventors: Hidenori Obiya, Nagaokakyo (JP); Hirotsugu Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/176,862

(22) Filed: Feb. 16, 2021

(65) Prior Publication Data

US 2021/0258094 A1 Aug. 19, 2021

(30) Foreign Application Priority Data

Feb. 19, 2020 (JP) .............................. JP2020-026093

(51) Int. Cl.
*H04J 1/04* (2006.01)
(52) U.S. Cl.
CPC ..................................... *H04J 1/045* (2013.01)
(58) Field of Classification Search
CPC ............................... H04J 1/045; H04B 1/0057
See application file for complete search history.

(56) References Cited

U.S. PATENT DOCUMENTS

| | | | |
|---|---|---|---|
| 2016/0127015 A1 | 5/2016 | Wloczysiak et al. | |
| 2017/0244431 A1* | 8/2017 | Araki ....................... | H04J 1/045 |
| 2019/0267956 A1* | 8/2019 | Granger-Jones ..... | H04B 1/1027 |
| 2021/0029698 A1* | 1/2021 | Lim ................... | H04W 72/0453 |

* cited by examiner

Primary Examiner — Kibrom T Hailu
Assistant Examiner — Nizam U Ahmed
(74) Attorney, Agent, or Firm — Pearne & Gordon LLP (57) ABSTRACT

A multiplexer includes: a common filter, a first filter connected to the common terminal and having a passband including a reception band of a first communication band; a second filter connected to the common terminal and having a passband including a transmission band of the first communication band; a third filter connected to the common terminal and having a passband including a transmission band of a second communication band; and a fourth filter connected to the common terminal and having a passband including a reception band of the second communication band. The transmission band of the first communication band and the transmission band of the second communication band are located between the reception band of the first communication band and the reception band of the second communication band, and at least one of the first communication band or the second communication band is a 5G-NR communication band.

20 Claims, 5 Drawing Sheets

|  | Filetr 10 $L_{10}$ | Filetr 20 $L_{20}$ | Filetr 30 $L_{30}$ | Filetr 40 $L_{40}$ |
|---|---|---|---|---|
| Communication system combination A | LTE-Rx Line length:4 | LTE-Tx Line length:2 | NR-Tx Line length:1 | NR-Rx Line length:3 |
| Communication system combination B | NR-Rx Line length:3 | NR-Tx Line length:1 | NR-Tx Line length:1 | NR-Rx Line length:3 |
| Communication system combination C | NR-Rx Line length:3 | NR-Tx Line length:1 | LTE-Tx Line length:2 | LTE-Rx Line length:4 |
|  | First communication band || Second communication band ||

MULTIPLEXER AND COMMUNICATION DEVICE

CROSS REFERENCE TO RELATED APPLICATION

The present application is based on and claims priority of Japanese Patent Application No. 2020-026093 filed on Feb. 19, 2020. The entire disclosure of the above-identified application, including the specification, drawings and claims is incorporated herein by reference in its entirety.

TECHNICAL FIELD

The present disclosure relates to multiplexers and communication devices.

BACKGROUND

Radio frequency front end circuits that support multiband and multimode communication should simultaneously transfer a plurality of radio frequency signals with a low loss and a high isolation.

United States Patent Application Publication No. 2016/0127015 discloses a reception module (a transfer circuit) having a configuration in which a plurality of filters having different passbands are connected to an antenna via a multiplexer (a switch).

BRIEF SUMMARY

In recent years, the simultaneous transfer of radio frequency signals using a 5th Generation (5G)-New Radio (NR) communication band has been stipulated in the Third Generation Partnership Project (3GPP). For example, the simultaneous transfer (EN-DC:LTE-NR Dual Connectivity), and so on, of radio frequency signals in a 5G-NR communication band and radio frequency signals in a 4th Generation (4G)-Long Term Evolution (LTE) communication band can be considered.

When the simultaneously transferring radio frequency signals in a first communication band and a second communication band which have different frequencies, it is necessary to ensure isolation between the radio frequency signals in the first communication band and the radio frequency signals in the second communication band. From this point of view, filters supporting the first communication band and the second communication band need to be provided individually.

Since the error vector magnitude (EVM) requirement specifications of radio frequency signals in 5G-NR are more severe compared to radio frequency signals in 4G-LTE, the required specifications are difficult to satisfy at the end region (a channel at the end of a communication band) of the filter passband in which the EVM tends to deteriorate. For this reason, as in the reception module disclosed in United States Patent Application Publication No. 2016/0127015, when a plurality of filters provided individually are applied to the simultaneous use of a first communication band and a second communication band which have a small frequency gap, ensuring satisfactory EVM throughout the communication band becomes difficult.

In view of this, the present disclosure provides a multiplexer and a communication device which are capable of suppressing the EVM deterioration even when the frequency gap between two communication bands for which simultaneous transfer is to be performed is small.

A multiplexer according to an aspect of the present disclosure is a multiplexer capable of simultaneously transferring a radio frequency signal in a first communication band and a radio frequency signal in a second communication band different from the first communication band, and includes: a common terminal; a first filter connected to the common terminal and having a passband including a reception band of the first communication band; a second filter connected to the common terminal and having a passband including a transmission band of the first communication band; a third filter connected to the common terminal and having a passband including a transmission band of the second communication band; and a fourth filter connected to the common terminal and having a passband including a reception band of the second communication band, wherein the transmission band of the first communication band and the transmission band of the second communication band are located between the reception band of the first communication band and the reception band of the second communication band, and at least one of the first communication band or the second communication band is a 5G-NR communication band.

The present disclosure can provide multiplexers and communication devices which are capable of suppressing the EVM deterioration even when the frequency gap between two communication bands for which simultaneous transfer is to be performed is small.

BRIEF DESCRIPTION OF DRAWINGS

These and other advantages and features will become apparent from the following description thereof taken in conjunction with the accompanying Drawings, by way of non-limiting examples of embodiments disclosed herein.

DETAILED DESCRIPTION OF EMBODIMENTS

Hereinafter, exemplary embodiments of the present disclosure will be described in detail with reference to the drawings. It should be noted that each of the subsequently described exemplary embodiments shows a generic or a specific example. The numerical values, shapes, materials, elements, the arrangement and connection of the elements, and others indicated in the following exemplary embodiments are mere examples, and therefore are not intended to limit the present disclosure. Among the elements described in the following exemplary embodiments, elements not recited in any one of the independent claims are described as optional elements. In addition, the sizes of the elements and the ratio of the sizes illustrated in the drawings are not necessarily accurate.

Furthermore, in the subsequent description, "signal path" refers to the transfer path formed by a line for propagating a radio frequency signal, an electrode directly connected to the line, a terminal directly connected to the line or the electrode, and so on.

Embodiment 1

1.1 Configuration of Multiplexer 1 and Communication Device

Figure 1:
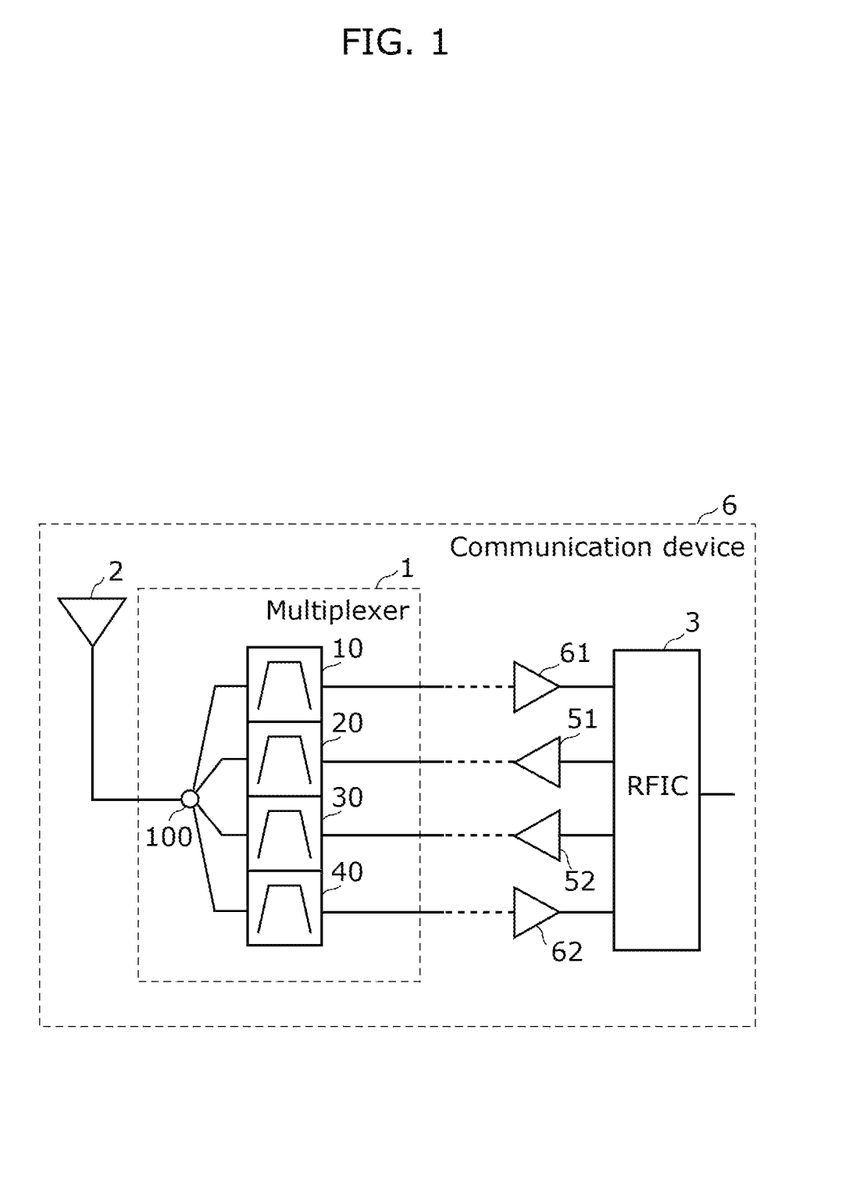
FIG. 1 is a circuit block diagram of a multiplexer and a communication device according to Embodiment 1.

FIG. 1 is a circuit block diagram of multiplexer 1 and communication device 6 according to Embodiment 1. As illustrated in FIG. 1, communication device 6 includes multiplexer 1, antenna 2, RF signal processing circuit (RFIC) 3, low-noise amplifiers 61 and 62, and power amplifiers 51 and 52.

RFIC 3 is an example of an RF signal processing circuit that processes a radio frequency signal which is transmitted or received by antenna 2. Specifically, RFIC 3 performs, by the downconversion, and so on, signal processing on a reception signal input via multiplexer 1, and outputs the reception signal generated by the signal processing to a baseband signal processing circuit (BBIC, not illustrated in the figures). Furthermore, RFIC 3 outputs a transmission signal processed based on a signal input from the BBIC, to multiplexer 1.

Antenna 2 is connected to common terminal 100 of multiplexer 1, emits radio frequency signals output from multiplexer 1, and receives radio frequency signals from the outside and outputs the received radio frequency signals to multiplexer 1.

Low-noise amplifier 61 is a reception amplifier which is disposed in the signal path connecting filter 10 included in multiplexer 1 and RFIC 3, and amplifies reception signals in a first communication band.

Low-noise amplifier 62 is a reception amplifier which is disposed in the signal path connecting filter 40 included in multiplexer 1 and RFIC 3, and amplifies reception signals in a second communication band.

Power amplifier 51 is a transmission amplifier which is disposed in the signal path connecting filter 20 included in multiplexer 1 and RFIC 3, and amplifies transmission signals in the first communication band.

Power amplifier 52 is a transmission amplifier which is disposed in the signal path connecting filter 30 included in multiplexer 1 and RFIC 3, and amplifies transmission signals in the second communication band.

It should be noted that, aside from low-noise amplifiers 61 and 62 and power amplifiers 51 and 52, switches and filters may be disposed as appropriate in the signal path connecting multiplexer 1 and RFIC 3.

Multiplexer 1 is disposed between antenna 2 and RFIC 3, demultiplexes reception signals input from antenna 2, and multiplexes transmission signals input from RFIC 3.

1.2 Communication Band Configuration of Multiplexer

Next, the detailed configuration of multiplexer 1 will be described. As illustrated in FIG. 1, multiplexer 1 includes common terminal 100 and filters 10, 20, 30, and 40.

Common terminal 100 is connected to one of the input or output terminal of filter 10, one of the input or output terminal of filter 20, one of the input or output terminal of filter 30, and one of the input or output terminal of filter 40. Furthermore, common terminal 100 is connected to antenna 2. It should be noted that common terminal 100 need not be directly connected to antenna 2, and a switch, an impedance matching circuit, a circulator, a splitter, and so on, may be interposed between antenna 2 and common terminal 100.

Filter 10, which is an example of a first filter, is connected to common terminal 100 and has a passband that includes a reception band of the first communication band. Filter 20, which is an example of a second filter, is connected to common terminal 100 and has a passband that includes a transmission band of the first communication band. Filter 30, which is an example of a third filter, is connected to common terminal 100 and has a passband that includes a transmission band of the second communication band having a frequency different from the first communication band. Filter 40, which is an example of a fourth filter, is connected to common terminal 100 and has a passband that includes a reception band of the second communication band.

It should be noted that each of filters 10 to 40 is directly connected with common terminal 100. However, an impedance matching element having at least one of an inductance or a capacitance may be disposed in the signal path connecting each of filters 10 to 40 and common terminal 100.

Furthermore, each of filters 10 to 40 may be any of an acoustic wave filter that makes use of surface acoustic waves (SAW), an acoustic wave filter that makes use of bulk acoustic waves (BAW), an LC resonant filter, and a dielectric filter, for example, but is not limited to these filters.

Figure 2:
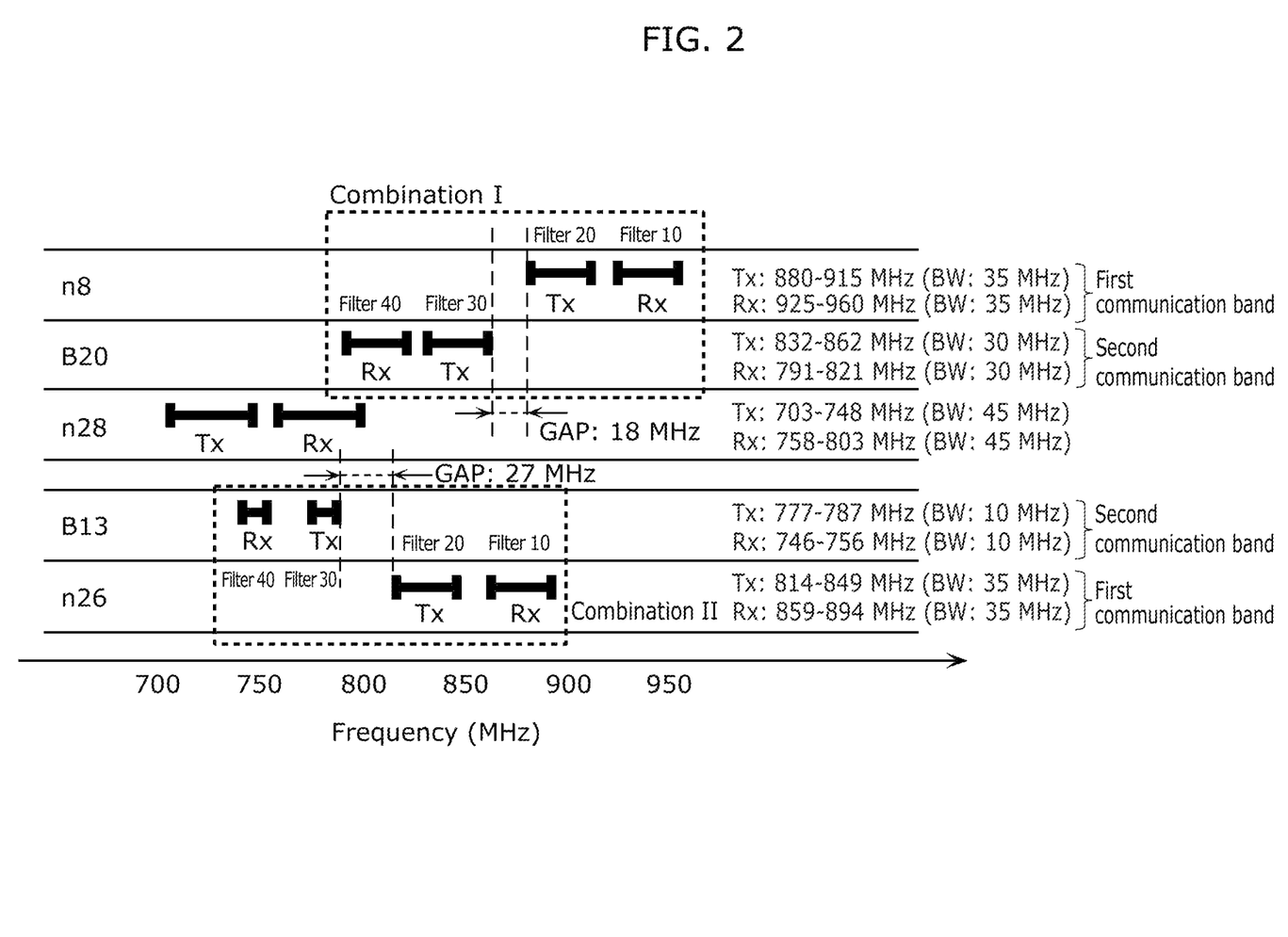
FIG. 2 is a diagram illustrating the frequency relationship between communication bands and passbands of respective filters included in the multiplexer according to Embodiment 1.

FIG. 2 is a diagram illustrating the frequency relationship between the communication bands and the passbands of the respective filters included in multiplexer 1 according to Embodiment 1. As illustrated in the figure, in combination I of the communication bands, the first communication band is n8 of 5G-NR, and the second communication band is Band 20 of 4G-LTE. When combination I is applied, the passband of filter 10 includes the reception band of n8 of 5G-NR, the passband of filter 20 includes the transmission band of n8 of 5G-NR, the passband of filter 30 includes the transmission band of Band 20 of 4G-LTE, and the passband of filter 40 includes the reception band of Band 20 of 4G-LTE. It should be noted that the passband of filter 40 may include the reception band of n28 of 5G-NR indicated in FIG. 2.

Furthermore, in combination II of the communication bands, the first communication band is n26 of 5G-NR, and the second communication band is Band 13 of 4G-LTE. When combination II is applied, the passband of filter 10 includes the reception band of n26 of 5G-NR, the passband of filter 20 includes the transmission band of n26 of 5G-NR, the passband of filter 30 includes the transmission band of Band 13 of 4G-LTE, and the passband of filter 40 includes the reception band of Band 13 of 4G-LTE. It should be noted that in multiplexer 1 according to this embodiment, at least one of the first communication band or the second communication band is a communication band of 5G-NR.

Here, in multiplexer 1 according to this embodiment, the transmission band of the first communication band and the transmission band of the second communication band are located between the reception band of the first communication band and the reception band of the second communication band. More specifically, the communication bands applied to multiplexer 1 according to this embodiment are arranged in the following order from the high frequency-side: the reception band of the first communication band; the transmission band of the first communication band; the transmission band of the second communication band; and the reception band of the second communication band.

With the above-described configuration, multiplexer 1 is capable of simultaneously transferring radio frequency signals in the first communication band and radio frequency signals in the second communication band different from the first communication band.

With the above-described configuration of multiplexer 1 according to this embodiment, the transmission band of the first communication band and the transmission band of the second communication band are adjacent each other, without each other's reception bands being sandwiched therebetween, in the frequency axis. Based on this frequency relationship, from the viewpoint of miniaturizing and simplifying a front-end circuit including multiplexer 1, it is assumed that the front-end circuit is provided with one filter having a passband that includes the transmission band of the first communication band and the transmission band of the second communication band.

However, when simultaneously using the first communication band and the second communication band in the front-end circuit, it is necessary to ensure an isolation between the radio frequency signals in the first communication band and the radio frequency signals in the second communication band in order to ensure a signal quality. From this viewpoint, it necessary to individually provide filters corresponding to the transmission band of the first communication band and the transmission band of the second communication band which are adjacent to each other.

However, even though the EVM requirement specifications of transmission signals in 5G-NR are more severe compared to transmission signals in 4G-LTE, the EVM tends to deteriorate at the end region (a channel at the end of a communication band) of the filter passband. As such, when simultaneously transferring transmission signals in the first communication band and transmission signals in the second communication band, it is difficult to ensure a good EVM throughout the passband because the transmission band of the first communication band and the transmission band of the second communication band are adjacent to each other.

In response to this, according to the above-described configuration, filters 10 to 40 are connected to common terminal 100, and thus the signal lines connecting common terminal 100 and each of the filters can be shortened. Therefore, since it is possible to suppress the deterioration of EVM due to transfer losses in the signal lines, the EVM deterioration can be suppressed for multiplexer 1 as a whole and for communication device 6.

It should be noted that the EVM is a signal quality index that indicates how far off an I-Q constellation point of a modulated signal is from an I-Q constellation point of an ideal modulated signal. The more the EVM increases, the more signal quality deteriorates.

It should be noted that the communication bands applied to multiplexer 1 according to this embodiment may be arranged in the following order from the low frequency-side: the reception band of the first communication band; the transmission band of the first communication band; the transmission band of the second communication band; and the reception band of the second communication band.

Furthermore, the communication bands applied to multiplexer 1 according to this embodiment may be arranged in the following order from the high frequency-side: the reception band of the first communication band; the transmission band of the second communication band; the transmission band of the first communication band; and the reception band of the second communication band.

Moreover, the communication bands applied to multiplexer 1 according to this embodiment may be arranged in the following order from the low frequency-side: the reception band of the first communication band; the transmission band of the second communication band; the transmission band of the first communication band; and the reception band of the second communication band.

It should be noted that in communication band combinations I and II shown in FIG. 2, the frequency gap between the transmission band of the first communication band and the transmission band of the second communication band may be narrower than the transmission band width of the first communication band. Specifically, in combination I, frequency gap GAP between the transmission band of the first communication band (n8 of 5G-NR) and the transmission band of the second communication band (Band 20 of 4G-LTE) is 18 MHz, and the transmission band width of the first communication band (n8 of 5G-NR) is 35 MHz. Furthermore, in combination II, frequency gap GAP between the transmission band of the first communication band (n26 of 5G-NR) and the transmission band of the second communication band (Band 13 of 4G-LTE) is 27 MHz, and the transmission band width of the first communication band (n26 of 5G-NR) is 35 MHz.

In combinations I and II, since the frequency gap between the transmission band of the first communication band and the transmission band of the second communication band is relatively small, the EVM deterioration in the end region of the transmission band of the first communication band which is adjacent to the transmission band of the second communication band tends to be severe, and the EVM deterioration in the end region of the transmission band of the second communication band which is adjacent to the transmission band of the first communication band tends to be severe.

In contrast, even when the frequency gap between the transmission band of the first communication band and the transmission band of the second communication band is relatively small, with the above-described configuration, filters 10 to 40 are connected to common terminal 100, and thus the signal lines connecting common terminal 100 and the respective filters can be shortened. Therefore, since the EVM deterioration due to transfer loss in the signal lines that transfer transmission signals in particular can be suppressed, the EVM deterioration in multiplexer 1 as a whole can be suppressed.

It should be noted that, in multiplexer 1 according to this embodiment, the first communication band is not limited to n8 or n26 of 5G-NR. Furthermore, the second communication band is not limited to Band 20 or Band 13 of 4G-LTE. As the first communication band and the second communication band, a combination that satisfies the following conditions is sufficient: (1) that the reception band of the first communication band, the transmission band of the first communication band, the transmission band of the second communication band, and the reception band of the second communication band are arranged in this order from the low frequency-side or the high frequency-side; and (2) that at least one of the first communication band and the second communication band is a communication band for 5G-NR which is a communication system.

1.3 Mounting Configuration of Multiplexer 1

Figure 3A:
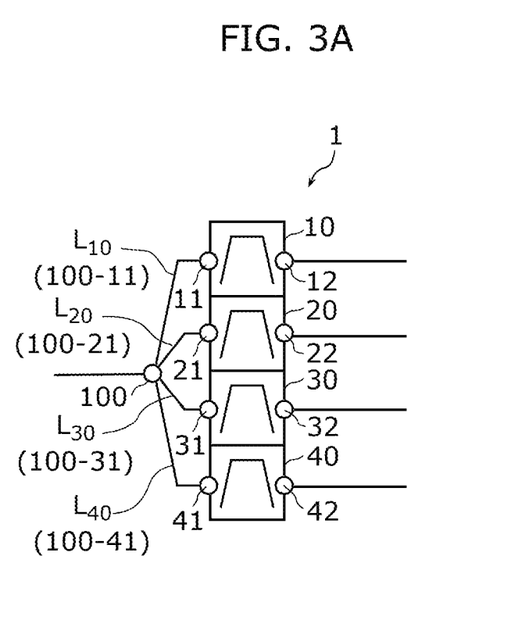
FIG. 3A is a diagram illustrating a wiring configuration of the multiplexer according to Embodiment 1.

FIG. 3A is a diagram illustrating a wiring configuration of multiplexer 1 according to Embodiment 1. As illustrated in the figure, filter 10 includes input terminal 11 and output terminal 12. Input terminal 11 is an example of a first input or output terminal and is connected to common terminal 100. Filter 20 includes output terminal 21 and input terminal 22. Output terminal 21 is an example of a second input or output terminal and is connected to common terminal 100. Filter 30 includes output terminal 31 and input terminal 32. Output terminal 31 is an example of a third input or output terminal and is connected to common terminal 100. Filter 40 includes input terminal 41 and output terminal 42. Input terminal 41 is an example of a fourth input or output terminal and is connected to common terminal 100.

In FIG. 3A, the length of the signal line connecting input terminal 11 and common terminal 100 is denoted as line length L10, the length of the signal line connecting output terminal 21 and common terminal 100 is denoted as line length L20, the length of the signal line connecting output terminal 31 and common terminal 100 is denoted as line length L30, and the length of the signal line connecting input terminal 41 and common terminal 100 is denoted as line length L40.

Figure 3B:
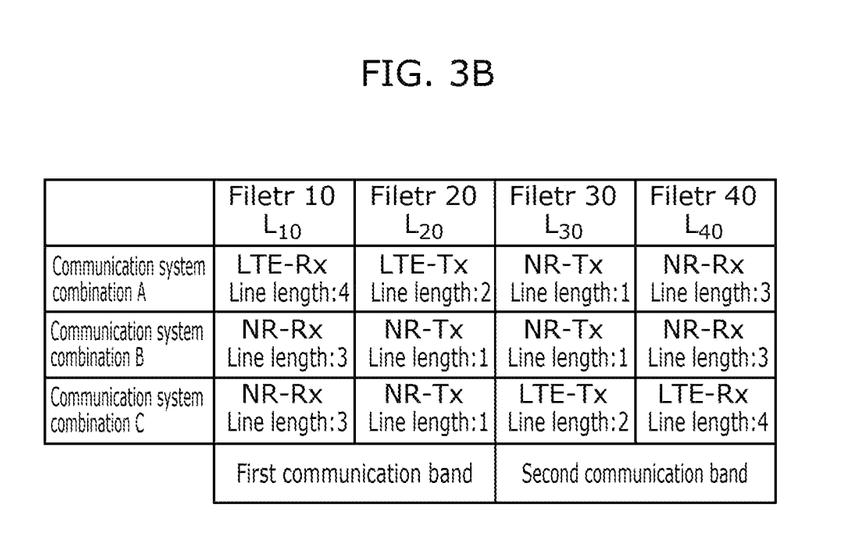
FIG. 3B is a table indicating priority of respective line lengths corresponding to combinations of communication systems of the multiplexer according to Embodiment 1.

FIG. 3B is a table indicating the priority of respective line lengths corresponding to combinations of communication systems of multiplexer 1 according to Embodiment 1. It should be noted that in FIG. 3B, "line length: 1" to "line length: 4" indicate the priority for shortening line length, and "line length: 1" means a highest priority for shortening the line length.

In communication system combination C in the bottom row in FIG. 3B, the first communication band is a communication band of 5G-NR and the second communication band is a communication band of 4G-LTE. Here, line length L20 may be less than or equal to line length L30, and less than or equal to line length L10, and less than or equal to line length L40.

Accordingly, since line length L20 of the signal line to be connected to filter 20, which passes the transmission signals in the first communication band of 5G-NR which has the most severe EVM requirement specifications, can be made shorter than the other line lengths, the deterioration of EVM of transmission signals in 5G-NR can be effectively suppressed.

Furthermore, in communication system combination C in the bottom row in FIG. 3B, line length L20 may be less than or equal to line length L10 and less than or equal to line length L40, and line length L30 may be less than or equal to line length L10 and less than or equal to line length L40.

Accordingly, deterioration of the EVMs of the transmission signals in the first communication band of 5G-NR and the transmission signals in the second communication band of 4G-LTE can be effectively suppressed.

Furthermore, in communication system combination A in the top row in FIG. 3B, the first communication band is a communication band of 4G-LTE and the second communication band is a communication band of 5G-NR. Here, line length L30 may be less than or equal to line length L20, and less than or equal to line length L40, and less than or equal to line length L10.

Accordingly, since line length L30 of the signal line to be connected to filter 30, which passes the transmission signals in the second communication band of 5G-NR which has the most severe EVM requirement specifications, can be made shorter than the other line lengths, the deterioration of EVM of transmission signals in 5G-NR can be effectively suppressed.

Furthermore, in communication system combination A in the top row in FIG. 3B, line length L30 may be less than or equal to line length L40 and less than or equal to line length L10, and line length L20 may be less than or equal to line length L10 and less than or equal to line length L40.

Accordingly, deterioration of the EVMs of the transmission signals in the second communication band of 5G-NR and the transmission signals in the first communication band of 4G-LTE can be effectively suppressed.

Furthermore, in communication system combination B in the middle of FIG. 3B, each of the first communication band and the second communication band is a communication band of 5G-NR. Here, line length L20 may be less than or equal to line length L10 and less than or equal to line length L40, and line length L30 may be less than or equal to line length L10 and less than or equal to line length L40.

Accordingly, since line length L20 and line length L30 of the signal lines that transfer the transmission signals in 5G-NR which has the most severe EVM requirement specifications can be made shorter than line length L10 and line length L40 of the signal lines that transfer reception signals, the deterioration of EVM of transmission signals in 5G-NR can be effectively suppressed.

Figure 4A:
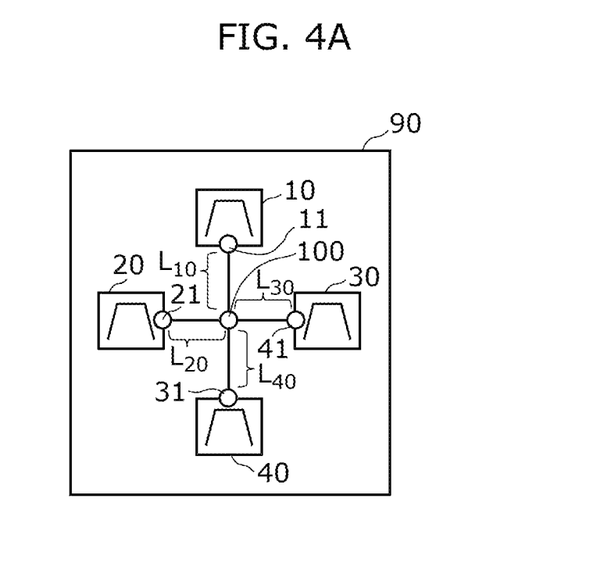
FIG. 4A is a diagram illustrating a first example of a mounting configuration of the multiplexer according to Embodiment 1.

FIG. 4A is a diagram illustrating a first example of a mounting configuration of multiplexer 1 according to Embodiment 1. In the figure, the mounting configuration of multiplexer 1 disposed on board 90 is schematically illustrated.

In FIG. 4A, electronic components can be mounted, for example, on the principal surfaces and inside board 90, and board 90 is, for example, a low temperature co-fired ceramic (LTCC) board having a stacked structure of a plurality of dielectric layers, a high temperature co-fired ceramic (HTCC) board, a component-embedded board, a board having a redistribution layer (RDL), a printed circuit board, or the like.

Each of filters 10 to 40 is, for example, a filter element in chip form which is built into a single package or mounted on a single substrate. Common terminal 100 and filters 10 to 40 are disposed on the same board 90. Accordingly, since the signal lines connecting common terminal 100 and each of the filters can be formed on the same board 90, the signal lines can be shortened and multiplexer 1 can be miniaturized.

Furthermore, in FIG. 4A, filters 10 to 40 are disposed surrounding common terminal 100 in a plan view of board 90. Accordingly, the four signal lines connecting common terminal 100 and each of the filters can be shortened, and multiplexer 1 can be miniaturized.

Furthermore, in FIG. 4A, board 90 may be a piezoelectric board. In this case, each of filters 10 to 40 is, for example, a SAW filter. The interdigital transducer (IDT) electrodes included in each of filters 10 to 40 are formed on board 90. In other words, common terminal 100 and filters 10 to 40 are disposed on the same piezoelectric board 90. Accordingly, since the signal lines connecting common terminal 100 and each of the filters can be formed on the same board 90, the signal lines can be shortened and multiplexer 1 can be miniaturized.

Figure 4B:
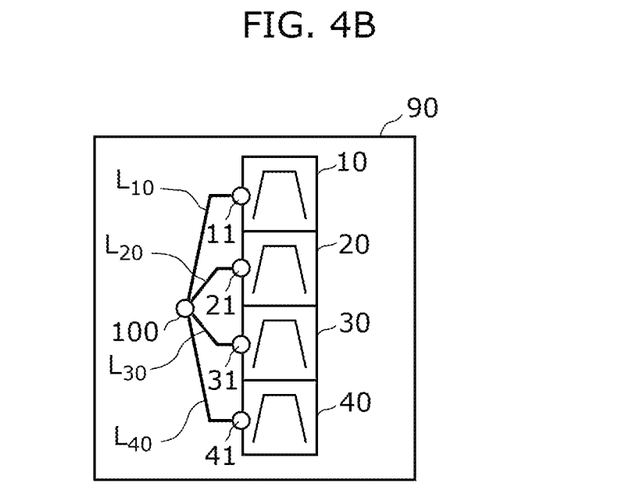
FIG. 4B is a diagram illustrating a second example of a mounting configuration of the multiplexer according to Embodiment 1.

FIG. 4B is a diagram illustrating a second example of a mounting configuration of multiplexer 1 according to Embodiment 1. In the figure, the mounting configuration of multiplexer 1 disposed on board 90 is schematically illustrated.

In FIG. 4B, electronic components can be mounted, for example, on the principal surfaces and inside board 90, and board 90 is, for example, an LTCC board having a stacked structure of a plurality of dielectric layers, an HTCC board, a component-embedded board, a board having an RDL, a printed circuit board, or the like.

Each of filters 10 to 40 is, for example, a filter element in chip form which is built into a single package or mounted on a single substrate. Common terminal 100 and filters 10 to 40 are disposed on the same board 90. Accordingly, since the signal lines connecting common terminal 100 and each of the filters can be formed on the same board 90, the signal lines can be shortened and multiplexer 1 can be miniaturized.

Furthermore, in FIG. 4B, filters 10 to 40 are arranged in the order of filter 10, 20, 30, and 40 in a plan view of board 90. Furthermore, among input terminals 11 and 41 and output terminals 21 and 31, common terminal 100 is disposed closest to output terminals 21 and 31. Accordingly, the signal line connecting common terminal 100 and filter 20 and the signal line connecting common terminal 100 and filter 30 can be shortened, and multiplexer 1 can be miniaturized.

Furthermore, in FIG. 4B, board 90 may be a piezoelectric board. In this case, each of filters 10 to 40 is, for example, a SAW filter. The IDT electrodes included in each of filters 10 to 40 are formed on board 90. In other words, common terminal 100 and filters 10 to 40 are disposed on the same piezoelectric board 90. Accordingly, since the signal lines connecting common terminal 100 and each of the filters can be formed on the same board 90, the signal lines can be shortened and multiplexer 1 can be miniaturized.

It should be noted that, in this embodiment, common terminal 100 of multiplexer 1 is defined as follows. Common terminal 100 is defined as the node that is closest to filters 10 to 40 in the paths in which the four signals of the reception signal and the transmission signal in the first communication band and the reception signal and the transmission signal in the second communication band flow, in the signal paths connecting antenna 2 and filters 10 to 40.

Furthermore, in this embodiment, input terminal 11 of filter 10 and input terminal 41 of filter 40 are defined as follows. When filters 10 and 40 are filter elements in chip form, each of input terminals 11 and 41 is defined as an input electrode or input terminal disposed on an outer surface of the chip. Furthermore, when filters 10 and 40 are acoustic wave filters formed on a piezoelectric board, each of input terminals 11 and 41 is defined as an input electrode or input terminal that is formed on the piezoelectric board and is to be connected to an external board via a bump or a solder ball.

Furthermore, in this embodiment, output terminal 21 of filter 20 and output terminal 31 of filter 30 are defined as follows. When filters 20 and 30 are filter elements in chip form, each of output terminals 21 and 31 is defined as an output electrode or output terminal disposed on an outer surface of the chip. Furthermore, when filters 20 and 30 are acoustic wave filters formed on a piezoelectric board, each of output terminals 21 and 31 is defined as an output electrode or output terminal that is formed on the piezoelectric board and is to be connected to an external board via a bump or a solder ball.

It should be noted that, although each of the first communication band and the second communication band is exemplified as a communication band that supports frequency division duplex (FDD) and is divided into a transmission band and a reception band in this embodiment, the present disclosure is not limited to such a configuration.

Specifically, in multiplexer 1, the passband of filter 10 may include a first TDD band that supports time division duplex (TDD), the passband of filter 20 may include a second TDD band, the passband of filter 30 may include a third TDD band, and the passband of filter 40 may include a fourth TDD band. Here, at least one of the first to fourth TDD bands is a TDD band that supports a high power mode, and at least another one of the first to fourth TTD bands is a TDD band that supports a low power mode. Here, the length of the signal line connecting common terminal 100 and the input or output terminal of the filter having a passband that includes the TDD band that supports the high power mode among filters 10 to 40 is less than the length of the signal line connecting common terminal 100 and the input or output terminal of the filter having a passband that includes the TDD band that supports the low power mode among filters 10 to 40.

It should be noted that the high power mode is, for example, a mode for communicating in power class 3 (+23 dBm) and power class 2 (greater than +23 dBm). When operating the multiplexer in high power mode, it is assumed that, due to transfer loss in the transmission path that transfers the transmission signal in the TDD band that supports the high power mode, the EVM of the transmission signal will deteriorate significantly.

In contrast, according to the above-described configuration, the line length of the signal line connecting common terminal 100 and the filter that passes the transmission signals in the TDD band supporting the high power mode can be made shorter than the line length of the signal line connecting common terminal 100 and the filter that passes the transmission signals in the TDD band supporting the low power mode, and thus the deterioration of the EVM of the transmission signals supporting the high power mode can be suppressed.

It should noted that in this case, the passband of filter 10 may include, for example, wireless local area network (WLAN) 6 GHz, the passband of filter 20 may include, for example, WLAN 5 GHz, the passband of filter 30 may include, for example, n79 of 5G-NR, and the passband of filter 40 may include, for example, n77 of 5G-NR.

Furthermore, the passband of at least one of filters 10 to 40 may include the transmission band and the reception band of the FDD band.

Furthermore, the passband of filters 10 and 20 may include, for example, NR-U instead of WLAN. It should be noted that NR-U is a 5G-NR band of at least 5 GHz in 3GPP, and corresponds to the U-NII communication band within the unlicensed band of the Federal Communication Commission (FCC).

Furthermore, when multiplexer 1 includes a plurality of filters having passbands including the TDD band as described above, it is sufficient that the number of the plurality of filters be at least 2. In this case, it is sufficient that at least one of the plurality of filters has a passband that includes a TDD band supporting the high power mode and at least another one of the plurality of filters has a passband that includes a TDD band supporting the low power mode. Here, the length of the signal line connecting common terminal 100 and the input or output terminal of the filter having a passband that includes the TDD band that supports the high power mode among the plurality of filters is less than the length of the signal line connecting common terminal 100 and the input or output terminal of the filter having a passband that includes the TDD band that supports the low power mode among the plurality of filters.

Accordingly, the line length of the signal line connecting common terminal 100 and the filter that passes the transmission signals in the TDD band supporting the high power mode can be made shorter than the line length of the signal line connecting common terminal 100 and the filter that passes the transmission signals in the TDD band supporting the low power mode, and thus the deterioration of the EVM of the transmission signals supporting the high power mode can be suppressed.

Embodiment 2

In this embodiment, a communication device including a plurality of multiplexers having the same circuit configuration as multiplexer 1 according to Embodiment 1 will be described.

2.1 Circuit Configuration of Multiplexers 1A and 1B and Communication Device 8

Figure 5:
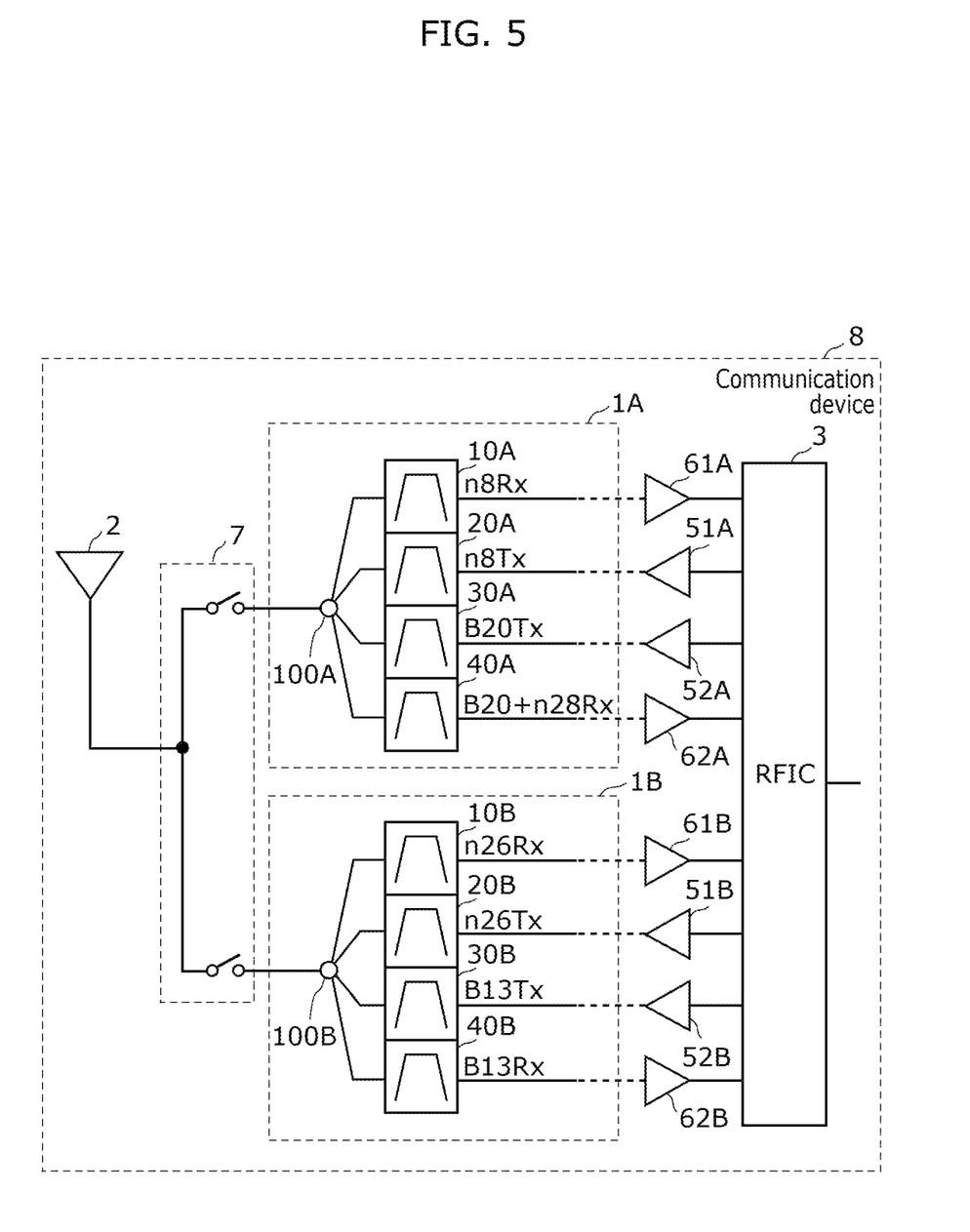
FIG. 5 is a circuit block diagram of a multiplexer and a communication device according to Embodiment 2.

FIG. 5 is a circuit block diagram of multiplexers 1A and 1B and communication device 8 according to Embodiment 2. As illustrated in the figure, communication device 8 includes multiplexers 1A and 1B, antenna 2, RFIC 3, switch 7, low-noise amplifiers 61A, 62A, 61B, and 62B, and power amplifiers 51A, 52A, 51B and 52B. Compared to communication device 6 according to Embodiment 1, communication device 8 according to this embodiment is different in including two multiplexers 1A and 1B, switch 7, four low-noise amplifiers, and fourth power amplifiers. Hereinafter, communication device 8 according to this embodiment will be described omitting description of points that are the same as in communication device 6 according to Embodiment 1, and focusing on the points that are different.

Switch 7 is disposed between antenna 2 and multiplexers 1A and 1B, and switches between connection and disconnection of antenna 2 and multiplexer 1A, and switches between connection and disconnection of antenna 2 and multiplexer 1B.

Low-noise amplifier 61A is a reception amplifier which is disposed in the signal path connecting filter 10A included in multiplexer 1A and RFIC 3, and amplifies reception signals in a first communication band.

Low-noise amplifier 62A is a reception amplifier which is disposed in the signal path connecting filter 40A included in multiplexer 1A and RFIC 3, and amplifies reception signals in a second communication band.

Power amplifier 51A is a transmission amplifier which is disposed in the signal path connecting filter 20A included in multiplexer 1A and RFIC 3, and amplifies transmission signals in the first communication band.

Power amplifier 52A is a transmission amplifier which is disposed in the signal path connecting filter 30A included in multiplexer 1A and RFIC 3, and amplifies transmission signals in the second communication band.

Low-noise amplifier 61B is a reception amplifier which is disposed in the signal path connecting filter 10B included in multiplexer 1B and RFIC 3, and amplifies reception signals in a third communication band.

Low-noise amplifier 62B is a reception amplifier which is disposed in the signal path connecting filter 40B included in multiplexer 1B and RFIC 3, and amplifies reception signals in a fourth communication band.

Power amplifier 51B is a transmission amplifier which is disposed in the signal path connecting filter 20B included in multiplexer 1B and RFIC 3, and amplifies transmission signals in the third communication band.

Power amplifier 52B is a transmission amplifier which is disposed in the signal path connecting filter 30B included in multiplexer 1B and RFIC 3, and amplifies transmission signals in the fourth communication band.

It should be noted that, aside from low-noise amplifiers 61A, 62A, 61B, and 62B and power amplifiers 51A, 52A, 51B, and 52B, switches, filters, and so on, may be disposed in the signal path connecting multiplexer 1A and RFIC 3 and the signal line connecting multiplexer 1B and RFIC 3.

Multiplexer 1A and 1B are disposed between antenna 2 and RFIC 3, demultiplex reception signals input from antenna 2, and multiplex transmission signals input from RFIC 3.

Multiplexer 1A includes common terminal 100A and filters 10A, 20A, 30A, and 40A.

Common terminal 100A is connected to one of the input or output terminal of filter 10A, one of the input or output terminal of filter 20A, one of the input or output terminal of filter 30A, and one of the input or output terminal of filter 40A. Furthermore, common terminal 100A is connected to switch 7.

Filter 10A, which is an example of a first filter, is connected to common terminal 100A and has a passband that includes a reception band of the first communication band. Filter 20A, which is an example of a second filter, is connected to common terminal 100A and has a passband that includes a transmission band of the first communication band. Filter 30A, which is an example of a third filter, is connected to common terminal 100A and has a passband that includes a transmission band of the second communication band having a frequency different from the first communication band. Filter 40A, which is an example of a fourth filter, is connected to common terminal 100A and has a passband that includes a reception band of the second communication band. The first communication band is n8 of 5G-NR, and the second communication band is Band 20 of 4G-LTE. In addition, the passband of filter 40A includes a reception band of n28 of 5G-NR.

It should be noted that each of filters 10A to 40A is directly connected with common terminal 100A. However, an impedance matching element having at least one of an inductance or a capacitance may be disposed in the signal path connecting each of filters 10A to 40A and common terminal 100A.

The communication bands applied to multiplexer 1A are arranged in the following order from the high frequency-side: the reception band of the first communication band; the transmission band of the first communication band; the transmission band of the second communication band; and the reception band of the second communication band.

With the above-described configuration, multiplexer 1A is capable of simultaneously transferring radio frequency signals in the first communication band and radio frequency signals in the second communication band different from the first communication band.

Multiplexer 1B includes common terminal 100B and filters 10B, 20B, 30B, and 40B.

Common terminal 100B is connected to one of the input or output terminal of filter 10B, one of the input or output terminal of filter 20B, one of the input or output terminal of filter 30B, and one of the input or output terminal of filter 40B. Furthermore, common terminal 100B is connected to switch 7.

Filter 10B is connected to common terminal 100B, and has a passband that includes a reception band of the third communication band. Filter 20B is connected to common terminal 100B, and has a passband that includes a transmission band of the third communication band. Filter 30B is connected to common terminal 100B, and has a passband that includes a transmission band of the fourth communication band having a frequency different from the third communication band. Filter 40B is connected to common terminal 100B, and has a passband that includes a reception band of the fourth communication band. The third communication band is n26 of 5G-NR, and the fourth communication band is Band 13 of 4G-LTE.

It should be noted that each of filters 10B to 40B is directly connected with common terminal 100B. However, an impedance matching element having at least one of an inductance or a capacitance may be disposed in the signal path connecting each of filters 10B to 40B and common terminal 100B.

The communication bands applied to multiplexer 1B are arranged in the following order from the high frequency-side: the reception band of the third communication band; the transmission band of the third communication band; the transmission band of the fourth communication band; and the reception band of the fourth communication band.

With the above-described configuration, multiplexer 1B is capable of simultaneously transferring radio frequency signals in the third communication band and radio frequency signals in the fourth communication band different from the third communication band.

According to the above-described configuration of multiplexer 1A according to this embodiment, filters 10A to 40A are connected to common terminal 100A, and thus the signal lines connecting common terminal 100A and filters 10A to 40A can be shortened. Therefore, since it is possible to suppress the EVM deterioration in the transmission signals in the first communication band and transmission signals in the second communication band caused by the transmission band of the first communication band and the transmission band of the second communication band being adjacent to each other, the EVM deterioration in multiplexer 1A as a whole can be suppressed.

Furthermore, according to the above-described configuration of multiplexer 1B according to this embodiment, filters 10B to 40B are connected to common terminal 100B, and thus the signal lines connecting common terminal 100B and filters 10B to 40B can be shortened. Therefore, since it is possible to suppress the EVM deterioration in the transmission signals in the third communication band and transmission signals in the fourth communication band caused by the transmission band of the third communication band and the transmission band of the fourth communication band being adjacent to each other, the EVM deterioration in multiplexer 1B as a whole can be suppressed.

In addition, the EVM deterioration in communication device 8 can be suppressed.

As described above, multiplexer 1 according to Embodiments 1 and 2 is a multiplexer capable of simultaneously transferring a radio frequency signal in a first communication band and a radio frequency signal in a second communication band different from the first communication band, and includes: common terminal 100; filter 10 connected to common terminal 100 and having a passband including a reception band of the first communication band; filter 20 connected to common terminal 100 and having a passband including a transmission band of the first communication band; filter 30 connected to common terminal 100 and having a passband including a transmission band of the second communication band; and filter 40 connected to common terminal 100 and having a passband including a reception band of the second communication band. Here, the transmission band of the first communication band and the transmission band of the second communication band are located between the reception band of the first communication band and the reception band of the second communication band, and at least one of the first communication band or the second communication band is a 5G-NR communication band.

Accordingly, since filters 10 to 40 are connected to common terminal 100, the signal lines connecting common terminal 100 and each of the filters can be shortened. Therefore, since it is possible to suppress the deterioration of EVM due to transfer loss in the signal lines, the EVM deterioration for multiplexer 1 as a whole can be suppressed.

Furthermore, filter 10 may include input terminal 11 connected to common terminal 100, filter 20 may include output terminal 21 connected to common terminal 100, filter 30 may include output terminal 31 connected to common terminal 100, and filter 40 may include input terminal 41 connected to common terminal 100. Each of the first communication band and the second communication band may be a 5G-NR communication band. Line length L20 of the signal line connecting output terminal 21 and common terminal 100 may be less than or equal to line length L10 of the signal line connecting input terminal 11 and common terminal 100 and less than or equal to line length L40 of the signal line connecting input terminal 41 and common terminal 100, and line length L30 of the signal line connecting output terminal 31 and common terminal 100 may be less than or equal to line length L10 and less than or equal to line length L40.

Accordingly, since line length L20 and line length L30 of the signal lines that transfer the transmission signals in 5G-NR which has the most severe EVM requirement specifications can be made less than line length L10 and line length L40 of the signal lines that transfer reception signals, the deterioration of EVM of transmission signals in 5G-NR can be effectively suppressed Furthermore, the first communication band may be a communication band of 5G-NR, the second communication band may be a communication band of 4G-LTE, and line length L20 may be less than or equal to line L10, less than or equal to line length L30, and less than or equal to line length L40.

Accordingly, since line length L20 of the signal line to be connected to filter 20, which passes the transmission signals in the first communication band of 5G-NR which has the most severe EVM requirement specifications, can be made less than the other line lengths, the deterioration of EVM of transmission signals in 5G-NR can be effectively suppressed.

Furthermore, the first communication band may be a communication band of 5G-NR, the second communication band may be a communication band of 4G-LTE, line length L20 may be less than or equal to line L10 and less than or equal to line length L40, and line length L30 may be less than or equal to line length L10 and less than or equal to line length L40.

Accordingly, deterioration of the EVMs of the transmission signals in the first communication band of 5G-NR and the transmission signals in the second communication band of 4G-LTE can be effectively suppressed.

Furthermore, common terminal 100 and filters 10 to 40 may be mounted on the same board 90.

Accordingly, since the signal lines connecting common terminal 100 and each of the filters can be formed on the same board 90, the signal lines can be shortened and multiplexer 1 can be miniaturized.

Furthermore, each of filters 10 to 40 may be an acoustic wave filter, and common terminal 100 and filters 10 to 40 may be formed on the same piezoelectric board 90.

Accordingly, since the signal lines connecting common terminal 100 and each of the filters can be formed on the same piezoelectric board, the signal lines can be shortened and multiplexer 1 can be miniaturized.

Furthermore, the frequency gap between the transmission band of the first communication band and the transmission band of the second communication band may be narrower than the transmission band width of the first communication band.

When the frequency gap between the transmission band of the first communication band and the transmission band of the second communication band is relatively small, the EVM deterioration of the end portion of the transmission band of the first communication band which is adjacent to the transmission band of the second communication band tends to be severe, and the EVM deterioration of the end portion of the transmission band of the second communication band which is adjacent to the transmission band of the first communication band tends to be severe.

In contrast, even when the frequency gap between the transmission band of the first communication band and the transmission band of the second communication band is relatively small, filters 10 to 40 are connected to common terminal 100, and thus the signal lines connecting common terminal 100 and the respective filters can be shortened. Therefore, since the EVM deterioration due to transfer losses in the signal lines that transfer transmission signals in particular can be suppressed, the EVM deterioration in multiplexer 1 as a whole can be suppressed.

Furthermore, the first communication band may be n8 of 5G-NR, and the second communication band may be Band 20 of 4G-LTE.

Furthermore, the passband of filter 40 may include the reception band of n28 of 5G-NR.

Furthermore, the first communication band may be n26 of 5G-NR, and the second communication band may be Band 13 of 4G-LTE.

Furthermore, communication device 6 includes antenna 2, RFIC 3 that processes a radio frequency signals which is transmitted or received by antenna 2, and multiplexer 1 that transfers the radio frequency signal between antenna 2 and RFIC 3.

Accordingly, it is possible to provide communication device 6 capable of suppressing the EVM deterioration even when the frequency gap between two communication bands for which simultaneous transfer is to be performed is small.

Other Embodiments

Although multiplexers and communication devices according to the present disclosure have been described above based on exemplary embodiments, the present disclosure is not limited to the foregoing embodiments. The present disclosure also encompasses other embodiments achieved by combining arbitrary elements in the foregoing embodiments, variations resulting from various modifications to the foregoing embodiments that may be conceived by those skilled in the art without departing from the essence of the present disclosure, and various devices that include the multiplexers and the communication devices according to the present disclosure.

It should be noted that foregoing Embodiments 1 and 2 show multiplexer 1 which is applied to a frequency relationship in which the reception band of the first communication band, the transmission band of the first communication band, the transmission band of the second communication band, and the reception band of the second communication band are arranged in order from the low frequency-side or the radio frequency side. However, the multiplexer according to the present disclosure may be applied to a frequency relationship in which the transmission band of the first communication band, the reception band of the first communication band, the transmission band of the second communication band, and the reception band of the second communication band are arranged in order from the low frequency-side or the radio frequency side. Specifically, a multiplexer according to one aspect of the present disclosure is a multiplexer capable of simultaneously transferring a radio frequency signal in a first communication band and a radio frequency signal in a second communication band different from the first communication band, and includes: a common terminal; a first filter connected to the common terminal and having a passband including a transmission band of the first communication band; a second filter connected to the common terminal and having a passband including a reception band of the first communication band; a third filter connected to the common terminal and having a passband including a reception band of the second communication band; and a fourth filter connected to the common terminal and having a passband including a transmission band of the second communication band. Here, the reception band of the first communication band and the reception band of the second communication band are located between the transmission band of the first communication band and the transmission band of the second communication band, and at least one of the first communication band or the second communication band is a 5G-NR communication band. In other words, for the order of arrangement of the respective transmission bands and respective reception bands, it is sufficient that the transmission band of the first communication band, the reception band of the first communication band, the reception band of the second communication band, and the transmission band of the second communication band be arranged in order from the low frequency-side or the radio frequency side, or the transmission band of the first communication band, the reception band of the second communication band, the reception band of the first communication band, and the transmission band of the second communication band be arranged in order from the low frequency-side or the radio frequency side.

The EVM requirement specifications of signals in 5G-NR are more severe compared to signals in 4G-LTE, and EVM tends to deteriorate at the end portion (end channels of a communication band) of a filter passband. For this reason, when simultaneously transferring reception signals in the first communication band and reception signals in the second communication band, it is difficult to ensure good reception sensitivity throughout the passband because the reception band of the first communication band and the reception band of the second communication band are adjacent to each other, and thus EVM deteriorates accordingly.

In response to this, according to the above-described configuration, filters 10 to 40 are connected to common terminal 100, and thus the signal lines connecting common terminal 100 and each of the filters can be shortened. Therefore, since it is possible to suppress deterioration of reception sensitivity due to transfer loss in the signal lines described above, reception sensitivity deterioration can be suppressed for multiplexer 1 as a whole and communication device 6.

Moreover, in forgoing Embodiments 1 and 2, communication system means a communication system constructed using radio access technology (RAT) defined by a standards organization, and the like. (for example, 3GPP or Institute of Electrical and Electronic Engineers (IEEE)). The communication system can use, for example, a 5G-NR system, an LTE system, a wireless local area network (WLAN) system, and the like, but is not limited to these.

Furthermore, communication band means a frequency band that is defined in advance by a standards organization, and the like, for a communication system. The communication band can use, for example, a 5G-NR frequency band, an LTE frequency band, and the like, but is not limited to these.

Furthermore, in the multiplexers and communication devices according to the foregoing embodiments, a matching element such as an inductor and capacitor, as well as a switch circuit may be connected between circuit elements. It should be noted that the inductor may include a wire inductor configured by a wire that connects circuit elements.

Furthermore, in the foregoing embodiments, a transmission band and a reception band are arranged in this order, and the like, may mean that the transmission band and the reception band partially overlap. Furthermore, a transmission band is located between two reception bands may mean that at least one of the two reception bands and the transmission band partially overlap. Furthermore, a reception band is located between two transmission bands may mean that at least one of the two transmission bands and the reception band partially overlap.

The present disclosure, as a multiplexer and a communication device that can be applied to a multiband system including a communication band for 5G-NR, can be widely used in communication apparatuses such as a mobile phone.

The invention claimed is:

1. A multiplexer configured to simultaneously transfer a radio frequency signal in a first communication band and a radio frequency signal in a second communication band different from the first communication band, the multiplexer comprising:
   a common terminal;
   a first filter connected to the common terminal, the first filter having a passband including a reception band of the first communication band;
   a second filter connected to the common terminal, the second filter having a passband including a transmission band of the first communication band;
   a third filter connected to the common terminal, the third filter having a passband including a transmission band of the second communication band; and
   a fourth filter connected to the common terminal, the fourth filter having a passband including a reception band of the second communication band, wherein:
   the transmission band of the first communication band and the transmission band of the second communication band are located between the reception band of the first communication band and the reception band of the second communication band,
   at least one of the first communication band or the second communication band is a 5G-NR communication band,
   the first filter includes a first input or output terminal connected to the common terminal,
   the second filter includes a second input or output terminal connected to the common terminal,
   the third filter includes a third input or output terminal connected to the common terminal,
   the fourth filter includes a fourth input or output terminal connected to the common terminal,
   each of the first communication band and the second communication band is a 5G-NR communication band,
   a length of a signal line connecting the second input or output terminal and the common terminal is less than or equal to a length of a signal line connecting the first input or output terminal and the common terminal and is less than or equal to a length of a signal line connecting the fourth input or output terminal and the common terminal, and
   a length of a signal line connecting the third input or output terminal and the common terminal is less than or equal to the length of the signal line connecting the first input or output terminal and the common terminal and is less than or equal to the length of the signal line connecting the fourth input or output terminal and the common terminal.

2. The multiplexer according to claim 1, wherein the common terminal, the first filter, the second filter, the third filter, and the fourth filter are mounted on a same board.

3. The multiplexer according to claim 1, wherein
   each of the first filter, the second filter, the third filter, and the fourth filter is an acoustic wave filter, and
   the common terminal, the first filter, the second filter, the third filter, and the fourth filter are mounted on a same piezoelectric hoard.

4. The multiplexer according to claim 1, wherein a frequency gap between the transmission band of the first communication band and the transmission band of the second communication band is narrower than a transmission band width of the first communication band.

5. A communication device, comprising:
   an antenna;
   an RF signal processing circuit configured to process a radio frequency signal which is transmitted or received by the antenna; and
   the multiplexer according to claim 1 configured to transfer the radio frequency signal between the antenna and the RF signal processing circuit.

6. A multiplexer configured to simultaneously transfer a radio frequency signal in a first communication band and a radio frequency signal in a second communication band different from the first communication band, the multiplexer comprising:
   a common terminal;
   a first filter connected to the common terminal, the first filter having a passband including a reception band of the first communication band;
   a second filter connected to the common terminal, the second filter having a passband including a transmission band of the first communication band;
   a third filter connected to the common terminal, the third filter having a passband including a transmission band of the second communication band; and
   a fourth filter connected to the common terminal, the fourth filter having a passband including a reception band of the second communication band, wherein:
   the transmission band of the first communication band and the transmission band of the second communication band are located between the reception band of the first communication band and the reception band of the second communication band,
   at least one of the first communication band or the second communication band is a 5G-NR communication band,
   the first filter includes a first input or output terminal connected to the common terminal,
   the second filter includes a second input or output terminal connected to the common terminal,
   the third filter includes a third input or output terminal connected to the common terminal,
   the fourth filter includes a fourth input or output terminal connected to the common terminal,
   the first communication band is a 5G-NR communication band, the second communication band is a 4G-LTE communication band, and
a length of a signal line connecting the second input or output terminal and the common terminal is less than or equal to a length of a signal line connecting the first input or output terminal and the common terminal, and is less than or equal to a length of a signal line connecting the third input or output terminal and the common terminal, and is less than or equal to a length of a signal line connecting the fourth input or output terminal and the common terminal.

7. The multiplexer according to claim 6, wherein
the first communication band is 5G-NR n8, and
the second communication band is 4G-LTE Band 20.

8. The multiplexer according to claim 7, wherein
the passband of the fourth filter includes a reception band of 5G-NR n28.

9. The multiplexer according to claim 6, wherein
the first communication band is 5G-NR n26, and
the second communication band is 4G-LTE Band 13.

10. The multiplexer according to claim 6, wherein the common terminal, the first filter, the second filter, the third filter, and the fourth filter are mounted on a same board.

11. The multiplexer according to claim 6, wherein
each of the first filter, the second filter, the third filter, and the fourth filter is an acoustic wave filter, and
the common terminal, the first filter, the second filter, the third filter, and the fourth filter are mounted on a same piezoelectric board.

12. The multiplexer according to claim 6, wherein a frequency gap between the transmission band of the first communication band and the transmission band of the second communication band is narrower than a transmission band width of the first communication band.

13. A communication device, comprising:
an antenna;
an RF signal processing circuit configured to process a radio frequency signal which is transmitted or received by the antenna; and
the multiplexer according to claim 6 configured to transfer the radio frequency signal between the antenna and the RF signal processing circuit.

14. A multiplexer configured to simultaneously transfer a radio frequent signal in a first communication band and a radio frequency signal in a second communication band different from the first communication band, the multiplexer comprising:
a common terminal;
a first filter connected to the common terminal, the first filter having a passband including a reception band of the first communication band;
a second filter connected to the common terminal, the second filter having a passband including a transmission band of the first communication band;
a third filter connected to the common terminal, the third filter having a passband including a transmission band of the second communication band; and
a fourth filter connected to the common terminal, the fourth filter having a passband including a reception band of the second communication band,
wherein
the transmission band of the first communication band and the transmission band of the second communication band are located between the reception band of the first communication band and the reception band of the second communication band, and
at least one of the first communication band or the second communication band is a 5G-NR communication band,
the first filter includes a first input or output terminal connected to the common terminal,
the second filter includes a second input or output terminal connected to the common terminal,
the third filter includes a third input or output terminal connected to the common terminal,
the fourth filter includes a fourth input or output terminal connected to the common terminal,
the first communication band is a 5G-NR communication band,
the second communication band is a 4G-LTE communication band,
a length of a signal line connecting the second input or output terminal and the common terminal is less than or equal to a length of a signal line connecting the first input or output terminal and the common terminal and is less than or equal to a length of a signal line connecting the fourth input or output terminal and the common terminal, and
a length of a signal line connecting the third input or output terminal and the common terminal is less than or equal to the length of the signal line connecting the first input or output terminal and the common terminal and is less than or equal to the length of the signal line connecting the fourth input or output terminal and the common terminal.

15. The multiplexer according to claim 14, wherein the common terminal, the first filter, the second filter, the third filter, and the fourth filter are mounted on a same board.

16. The multiplexer according to claim 14, wherein
each of the first filter, the second filter, the third filter, and the fourth filter is an acoustic wave filter, and
the common terminal, the first filter, the second filter, the third filter, and the fourth filter are mounted on a same piezoelectric board.

17. The multiplexer according to claim 14, wherein a frequency gap between the transmission band of the first communication band and the transmission band of the second communication band is narrower than a transmission band width of the first communication band.

18. A communication device, comprising:
an antenna;
an RF signal processing circuit configured to process a radio frequency signal which is transmitted or received by the antenna; and
the multiplexer according to claim 14 configured to transfer the radio frequency signal between the antenna and the RF signal processing circuit.

19. The multiplexer according to claim 14, wherein
the first communication band is 5G-NR n8, and
the second communication band is 4G-LTE Band 20.

20. The multiplexer according to claim 14, wherein
the first communication band is 5G-NR n26, and
the second communication band is 4G-LTE Band 13.

* * * * *

UNITED STATES PATENT AND TRADEMARK OFFICE
CERTIFICATE OF CORRECTION

| | |
|---|---|
| PATENT NO. | : 11,444,712 B2 |
| APPLICATION NO. | : 17/176862 |
| DATED | : September 13, 2022 |
| INVENTOR(S) | : Hidenori Obiya and Hirotsugu Mori |

It is certified that error appears in the above-identified patent and that said Letters Patent is hereby corrected as shown below:

In the Claims

Claim 3, Column 18, Line 19:
"piezoelectric hoard." should be --piezoelectric board.--

Claim 14, Column 19, Line 46:
"radio frequent signal in a" should be --radio frequency signal in a--

Signed and Sealed this
Ninth Day of May, 2023

*Katherine Kelly Vidal*

Katherine Kelly Vidal
*Director of the United States Patent and Trademark Office*